US007671158B2

(12) United States Patent
Faust et al.

(10) Patent No.: US 7,671,158 B2
(45) Date of Patent: Mar. 2, 2010

(54) END-CAPPED POLYMER CHAINS AND PRODUCTS THEREOF

(75) Inventors: Rudolf Faust, Lexington, MA (US); Jae Cheol Cho, Ann Arbor, MI (US)

(73) Assignee: University of Massachusetts Lowell, Lowell, MA (US)

( * ) Notice: Subject to any disclaimer, the term of this patent is extended or adjusted under 35 U.S.C. 154(b) by 940 days.

(21) Appl. No.: 11/447,403

(22) Filed: Jun. 5, 2006

(65) Prior Publication Data
US 2006/0223946 A1 Oct. 5, 2006

Related U.S. Application Data

(62) Division of application No. 10/776,681, filed on Feb. 11, 2004, now Pat. No. 7,056,985.

(51) Int. Cl.
*C08F 10/10* (2006.01)
*C08F 110/10* (2006.01)
*C08F 210/10* (2006.01)

(52) U.S. Cl. .................. 526/348.7; 525/326.1
(58) Field of Classification Search ............. 526/348.7; 525/326.1
See application file for complete search history.

(56) References Cited

U.S. PATENT DOCUMENTS

| 4,129,557 A | 12/1978 | Kudo et al. |
| 4,182,818 A | 1/1980 | Tung et al. |
| 4,568,732 A | 2/1986 | Kennedy et al. |

(Continued)

FOREIGN PATENT DOCUMENTS

| EP | 0 024 120 | 2/1981 |
| EP | 0 379 250 A | 7/1990 |
| EP | 0 877 294 | 11/1998 |
| EP | 0 931 581 | 7/1999 |
| JP | 50092877 | 7/1975 |
| JP | 63049228 | 3/1988 |
| JP | 11176750 | 7/1999 |
| WO | WO 93/02110 | 2/1993 |
| WO | WO 95/17436 | 6/1995 |
| WO | WO-97/34938 A1 | 9/1997 |
| WO | WO 99/09074 | 2/1999 |
| WO | WO 99/24480 | 5/1999 |
| WO | WO 00/32609 | 6/2000 |
| WO | WO 00/32654 | 6/2000 |
| WO | WO 00/63256 | 10/2000 |
| WO | WO 01/87999 | 11/2001 |
| WO | WO 02/28924 | 4/2002 |
| WO | WO 03/011596 | 2/2003 |
| WO | WO 2004/113400 | 12/2004 |
| WO | WO 2005/012373 | 2/2005 |

OTHER PUBLICATIONS

Quirk et al., "Anionic synthesis of block and star branched polymers via 1,1-diphenylethylene-functionalized macromonomers", Polymer Preprints, 37(2), 402-403 (1996).*

(Continued)

*Primary Examiner*—Ling-Siu Choi
(74) *Attorney, Agent, or Firm*—McCarter & English, LLP

(57) ABSTRACT

According to an aspect of the present invention, a method is provided in which a double diphenylethylene compound is reacted with a polymer that contains a carbocationically terminated chain thereby providing a 1,1-diphenylene end-functionalized chain. Subsequently, an alkylating agent is reacted with the 1,1-diphenylene end-functionalized chain, thereby providing an alkylated 1,1-diphenylene end-functionalized chain. In some embodiments, the method further comprises (a) optionally combining a 1,1-diphenylorganolithium compound with the alkylated 1,1-diphenylene end-functionalized polymer followed by (b) reacting an organolithium compound with the alkylated 1,1-diphenylene end-functionalized polymer. This provides an anionically terminated polymer, which can be used, for example, in subsequent anionic polymerization and coupling reactions. According to another aspect of the present invention, a novel polymer is provided that comprises a polymer chain, which chain further comprises the following: (a) a plurality of constitutional units that correspond to cationically polymerizable monomer species and (b) an end-cap comprising a

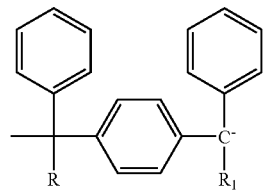

group or a

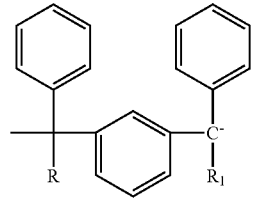

group, where R is a branched or unbranched alkyl group containing from 1 to 20 carbons and $R_1$ is a branched, unbranched, or cyclic alkyl group or an aryl group, containing from 1 to 20 carbons. Other aspects of the present invention relate to novel copolymers that comprise: (a) a first polymer block that comprises a plurality of constitutional units that correspond to isobutylene; and (b) a second polymer block that comprises a plurality of constitutional units that correspond to hydroxyethyl methacrylate.

7 Claims, No Drawings

U.S. PATENT DOCUMENTS

| | | | |
|---|---|---|---|
| 4,910,321 | A | 3/1990 | Faust et al. |
| 4,965,340 | A | 10/1990 | Matsuda |
| 5,122,572 | A | 6/1992 | Faust et al. |
| 5,428,111 | A | 6/1995 | Faust et al. |
| 5,451,647 | A | 9/1995 | Faust et al. |
| 5,637,647 | A | 6/1997 | Faust |
| 5,665,837 | A | 9/1997 | Faust et al. |
| 5,677,386 | A | 10/1997 | Faust |
| 5,690,861 | A | 11/1997 | Faust |
| 5,700,625 | A | 12/1997 | Sato et al. |
| 5,777,044 | A | 7/1998 | Faust |
| 5,981,785 | A | 11/1999 | Faust et al. |
| 6,025,437 | A | 2/2000 | Hirahara et al. |
| 6,046,281 | A | 4/2000 | Faust et al. |
| 6,051,657 | A | 4/2000 | Faust et al. |
| 6,194,597 | B1 | 2/2001 | Faust et al. |
| 6,268,451 | B1 | 7/2001 | Faust et al. |
| 6,469,115 | B1 | 10/2002 | Faust et al. |
| 6,750,267 | B2 | 6/2004 | Faust et al. |
| 2001/0047069 | A1 | 11/2001 | Chung et al. |
| 2002/0107330 | A1 | 8/2002 | Pinchuk et al. |
| 2003/0235602 | A1 | 12/2003 | Schwarz |

OTHER PUBLICATIONS

Quirk et al., "Anionic synthesis of 1,1-diphenylethylene-terminated polystyrene macromonomers. Rational synthesis of ABC hetero three-armed-star-branched polymers" Polymer Bulletin, 31, 29-36(1993).*

Quirk et al., "Anionic synthesis of polystyrene and polybutadiene heteroarm star polymers", Makromol. Chem. Macromol. Sym., 53, 201-210(1992).*

Allen, RD, et al. Preparation of High Purity, Anionic Polymerization Grade Alkyl Methacrylate Monomers. *Polymer Bull.*, 1986, 15:127-34.

Asthana, A, et al. Star-block Polymers of Multiple Polystyrene-b-polyisobutylene Arms Radiating from a Polydivinylbenzene Core. *J. Polymer. Sci. Part A: Polym. Chem.*, 1999, 37:2235-43.

Auschra, C, et al. Synthesis of Block Copolymers with Poly(methyl methacrylate): P(B-$b$-MMA), P(EB-$b$-MMA), P(S-$b$-B-$b$-MMA) and P(S-$b$-EB-$b$-MMA). *Polymer Bull.*, 1993, 30:257-64.

Bae, YC, et al. Halogen-free Polyiosbutylene by in situ Methylation of Living Polyisobutylene Using Dimethyl Zinc. *Polymer Bull.*, 2000, 44:453-59.

Bae, YC, et al. Addition Reaction of Living Polyisobutylene to "Double" Diphenylethylenes. Synthesis of 1,1-Diphenylethylene-Functionalized Polyisobutylene Macromonomers. *Macromolecules*, 1998, 31:9379-83.

Bae, YC, et al. Living Coupling Reaction in Living Castionic Polymerization. 2. Synthesis and Characterization of Amphiphilic $A_2B_2$ Star-Block Copolymer: Poly[bis(isobutylene)-$star$-bis(methyl vinyl ether)]. *Macromolecules*, 1998, 31,2480-87.

Chen, X, et al. Block Copolymers of Styrene and $p$-acetoxystyrene with Polyisobutylene by Combination of Living Carbocationic and Atom Transfer Radical Polymerizations. *Macromol. Chem., Rapid Commun.*, 1998, 19:585-89.

Coca, S, et al. Block Copolymers by Transformation of "Living" Carbocationic into "Living" Radical Polymerization. II. ABA-type Block Copolymers Comprising Rubbery Polyisobutylene Middle Segment. *J. Polymer. Sci. Part A: Polym. Chem.*, 1997, 35(16):3595-3601.

Domjan, A, et al. Structural Studies of Nanophase-Separated Poly(2-hydroxyethyl methacrylate)-☐-polyisobutylene Amphiphilic Conetworks by Solid-State NMR and Small-Angle X-ray Scattering. *Macromolecules*, vol. 36:9107-9114(2003).

Falkenhagen, J, et al. Characterization of Block Copolymers by Liquid Adsorption Chromatography at Critical Conditions. 1. Diblock Copolymers. *Macromolecules*, 2000, 33:3687-93.

Faust, R, et al. Living Carbocationic Polymerization. III. Demonstration of the Living Polymerization of Isobutylene. *Polym. Bull.*, 1986, 15:317-23.

Feldthusen, J, et al. Synthesis of Liner and Star-Shaped Block Copolymers of Isobutylene and Methacrylates by combination of Living Cationic and Anionic Polymerizations. *Macromolecules*, 1998, 31:578-85.

Feldthusen, J, et al. Stable Carbanions by Quantitative Metalation on Cationically Obtained Diphenylvinyl and Diphenylmethoxy Compounds: New Initiators for Living Anionic Polymerizations. *Macromolecules*, 1997, 30:6989-93.

Feldthusen, J, et al. Synthetic Approaches Towards New Polymer Systems by the Combination of Living Carbocationic and Anionic Polymerizations. *Macromol. Symp.*, vol. 107:189-198 (1996).

Fishbein, L, et al. The Relationship of Structure to Some Physical and Mechanical Properties of Poly (vinyl alkyl ethers). *Makromol Chem.*, 1961, 48:221-28.

Fodor, Z, et al. Polyisobutylene-based Thermoplastic Elastomers. II. Synthesis and Characterization of Poly($p$-methylstyrene-$block$-isobutylene-block-$p$-methylstyrene) Triblock Copolymers. *J. Macromol. Sci., Pure Appl. Chem.*, 1995, A32(3):575-91.

Fodor, Z, et al. Synthetic Applications of Non-polymerizable Monomers in Living Carbocationic Polymerization. Polymer Preprints, 1994, 35(2): 492-93.

Fodor, Z, et al. Living Carbocationic Polymerization of $p$-methylstyrene and Sequential Block Copolymerization of Isobutylene with $p$-Methylstyrene. *J. Macromol. Sci., Pure Appl. Chem.*, 1994, A31(12):1985-2000.

Gyor, M; et al. Polyisobutylene-based Thermoplastic Elastomers. I. Synthesis and Characterization of Polystyrene-Polyisobutylene-Polystyrene Triblock Copolymers. *J. Macromol Sci.*, 1994, A31(12):2055-65.

Gyor, M, et al. Living Carbocationic Polymerization of Isobutylene with Blocked Bifunctional Initiators in the Presence of di-$tert$-butylpyridine as a Proton Trap. *J. Macromol. Sci., Pure Appl. Chem.*, 1992, A29(8):639-53.

Hadjikyriacou, S; et al. Living Coupling Reaction in Living Cationic Polymerization. 3. Coupling Reaction of Living Polyisobutylene Using Bis(furanyl) Derivatives. *Macromolecules* 2000, 33:730-33.

Hadjikyriacou, S; et al. Cationic Macromolecular Design and Synthesis Using Furan Derivatives. *Macromolecules* 1999, 32:6393-99.

Hadjikyriacou, S. et al. Amphiphilic Block Copolymers by Sequential Living Cationic Polymerization: Synthesis and Characterization of Poly(isobutylene-$b$-methyl vinyl ether) *Macromolecules*, 1996, 29:5261-67.

Hadjikyriacou, S, et al. Living Cationic Homopolymerization of Isobutyl Vinyl Ether as Sequential Block Copolymerization of Isobutylene with Isobutyl Vinyl Ether. Synthesis and Mechanistic Studies. *Macromolecules*, 1995, 28:7893-7900.

Hadjikyriacou, S, et al. Synthetic Applications of Nonpolymerizable Monomers in Living Cationic Polymerization: Functional Polyisobutylenes by End-quenching. *J. Macromol. Sci., Pure Appl. Chem.* 1995, A32(6):1137-53.

Higashimura, T, et al. Living Cationic Polymerization of 4-$tert$-butoxystyrene and Synthesis of Poly(4-vinylphenol) with Narrow Molecular Weight Distribution. *Makromol. Chem., Suppl.* 1989, 15:127-36.

Hirai, A, et al. Polymerization of Monomers Containing Functional Groups Protected by Trialkylsilyl Groups. 1. Synthesis of Poly(4-vinylphenol) by Means of Anionic Living Polymerization. *Makromol. Chem., Rapid Commun.*, 1982, 3:941-46.

Hirao, A, et al. Polymerization of Monomers Containing Functional Groups Protected by Trialkylsilyl Groups. 5. Synthesis of Poly(20hydroxyethyl methacrylate) with a Narrow Molecular Weight Distribution by Means of Anionic Living Polymerization. *Macromolecules*, 1986, 19:1294-99.

Hsieh, HL, et al. *Anionic Polymerization*. NY: Marcel Dekker, 1996, pp. 307-392, 447-605, and 641-684.

Jung, ME, et al. Generation of the Enolate of Acetaldehyde from Non-carbonyl Substances and C-alkylation, O-acylation and O-silylation. *Tetrahedon Lett.*, 1977, 43:3791-94.

Kaszas, G, et al. Quasiliving Carbocationic Polymerization. XII. Forced Ideal Copolymerization of Isobutylene with Styrene. *J. Macromol. Sci.-Chem.*, 1982-3, A18(9):1367-82.

Kaszas, G, et al. Polyisobutylene-containing Block Polymers by Sequential Monomer Addition. II. Polystyrene-Polyisobutylene- Polystyrene Triblock Polymers: Synthesis, Characterization, and Physical Properties. *J. Polym. Sci., Polym. Chem. Ed.*, 1991, A29(1):427-35.

Kennedy, JP, et al. Polyisobutylene-containing Block Polymers by Sequential Monomer Addition. 8. Synthesis, Characterization, and Physical Properties of Poly(indene-*b*-isobutylene-*b*-indene) Thermoplastic Elastomers. *Macromolecules*, 1993, 26:429-35.

Kim, MS, et al. Synthesis of Poly(ε-caprolactone-*b*-isobutylene) Diblock Copolymer and Poly(ε-caprolactone-*b*-iosbutylene-*b*-ε-caprolactone) Triblock Copolymer. *Polym. Bull.*, 2002, 48(2), 127.

Kitayama, T, et al. PMMA-*block*-polyisobutylene-*block*-PMMA Prepared with α,ω-dilithiated Polyisobutylene and its Characterization. *Polymer Bull.*, 1991, 26:513-20.

Kurian, J, Living Carbocationic Polymerization of p-halostyrenes and Synthesis of Novel Thermoplastic Elastomers. Ph.D. Thesis, The University of Akron., 1991.

Kwon, Y, et al. Synthesis and Characterization of Poly(isobutylene-*b*-pivalolactone) Diblock and Poly(pivalolactone-*b*-isobutylene-*b*-pivalolactone) Triblock Copolymers. *Macromolecules*, 2002, 35:3348.

Ledwith, A, et al. Absolute Reactivity in the Cationic Polymerization of Methyl and Other Alkyl Vinyl Ethers. *Polymer*, 1975, 16(1):31-37.

Li, D, et al. Polyisobutylene-based Thermoplastic Elastomers. 3. Synthesis, Characterization, and Properties of Poly(α-methylstyrene-*b*-isobutylene-*b*-α-methylstyrene) Triblock Copolymers. *Macromolecules*, 1995, 28:4893-98.

Li, D, et al. Living Carbocationic Sequential Block Copolymerization of Isobutylene with α-methylstyrene. *Macromolecules*, 1995, 28:1383-89.

Lubnin, AV, et al. Living Carbocationic Polymerization of Isobutyl Vinyl Ether and the Synthesis of Poly[isobutylene-*b*-(isobutyl vinyl ether)]. *J. Polymer. Sci. Part A: Polym. Chem.*, 1993, 31:2825-34.

Martinez-Castro, N, et al. Polyisobutylene Stars and Polyisobutylene-*block*-Poly(*tert*-Butyl Methacrylate) Block Copolymers by Site Transformation of Thiophene End-Capped Polyisobutylene Chain Ends. *Macromolecules*, 2003, 36:6985-94.

Miyamoto, M, et al. Living Polymerization of Isobutyl Vinyl Ether with the Hydrogen Iodide/Iodine Initiating System. *Macromolecules*, 1984, 17(3):265-68.

Mori, H, et al. Protection and Polymerization of Functional Monomers. 23. Synthesis of a Well-defined Poly(2-hydroxyethyl methacrylate) by Means of Anionic Living Polymerization of Protected Monomers. *Macromol. Chem. Phys.*, 1994, 195:3213-24.

Ohgi, H, et al. Highly Isotactic Poly(vinyl alcohol). 2. Preparation and Characterization of Isotactic Poly(vinyl alcohol). *Macromolecules*, 1999, 32:2403.

Okamura, S, et al. The Cationic Polymerization of *t*-Butyl Vinyl Ether at Low Temperature and the Conversion into Polyvinyl Alcohol of Poly-*t*-butyl Vinyl Ether. *Makromol. Chem.*, 1962, 53:180-91.

Pasch, H. Liquid Chromatography at the Critical Point of Adsorption—A New Technique for Polymer Characterization. *Macromol. Symp.*, 1996, 110:107-20.

Pasch, H, et al. Chromatographic Investigations of Molecules in the Critical Range of Liquid Chromatography. 4. Analysis of Poly(styrene-*b*-methyl methacrylate). *Polymer*, 1993, 34(19):4100-04.

Pernecker, T, et al. Living Carbocationic Polymerization. 48. Poly(isobutylene-*b*-methyl vinyl ether). *Macromolecules*, 1992, 25:1642-47.

Puskas, JE, et al. Living Carbocationic Polymerization of Resonance-stabilized Monomers. *Prog. Polym. Sci.*, 2000, 25:403-52.

Quirk, RP, et al. Anionic Synthesis of Block and Star-Branched Polymers via 1,1-Diphenylethylene-functionalized Macromonomers. Polymer Preprints, 1996, 37(2): 402-03.

Radke, W, et al. Simulation of GPC-distribution Coefficients of Linear and Star-shaped Molecules in Spherical Pores. 2. Comparison of Simulation and Experiment. *Polymer*, 2003, 44:519-25.

Reed, PJ, et al. The Preparation and Analysis of High Purity Organolithium Initiators. *J. Organomet. Chem.*, 1972, 39:1-10.

Rembaum, A, et al. Decomposition of Ethyllithium in Tetrahydrofuran. J. Polymer Sci., 1962, 56:S17-S19.

Roovers, Jel, et al. Preparation and Characterization of Four-branched Star Polystyrene. *Macromolecules*, 1972, 5:384-88.

Ruth, WG, et al. Silicon-mediated synthesis of new amphiphilic oligomers. *J. Polymer Sci., Part A*, 1997, 35: 163-70.

Ruth, WG, et al. Synthesis of poly(tert-butyldimethylsilyl vinyl ether) block copolymers using silyl aldol polymerization. *Polymer Preprints*, 1993, 34(2): 584-5.

Satoh, K, et al. Direct Synthesis of Amphiphilic Random and Block Copolymers of *p*-hydroxystyrene and *p*-methoxystyrene via Living Cationic Polymerization with $BF_3OEt_2$/ROH Systems. *Macromolecules*, 2000, 33(16):5830-35.

Satoh, K, et al. Direct Living Cationic Polymerization of p-hydroxystyrene with Boron Trifluoride Etherate in the Presence of Water. *Macromolecules*, 2000, 33(15):5405-10.

Schlaad, H, et al. Kinetic Studies on the Capping Reaction of Living Polyisobutylene with 1,1-diphenylethylene. 1. Effect of Temperature and Comparison to the Model Compound 2-chloro-2,4,4-trimethylpentane. *Macromolecules*, 1998, 31:8058-62.

Shibasaki, Y., et al. Reduction of the Cationic Growing Center of Polyisobutylene by Activated Magnesium. Block Copolymerization of Isobutylene with *tert*-butyl Methacrylate. *Macromol. Chem. Phys.*, 1998, 199(11):2619-23.

Sipos, L, et al. Synthesis of Poly(*L*-lactide)-*block*-polyisobutylene-*block*-poly(*L*-lactide), a New Biodegradable Thermoplastic Elastomer. *Macromol. Rapid Commun.*, 1995, 16(12):935-40.

Storey, RF, et al. Aspects of the Synthesis of Poly(styrene-*b*-isobutylene-*b*-styrene) Block Copolymers Using Living Carbocationic Polymerization. *Macromolecules*, 1993, 26:6727-33.

Tsunogae, Y, et al. Polyisobutylene-containing Block Polymers by Sequential Monomer Addition. X. Synthesis of Poly(α-methylstyrene-*b*-isobutylene-*b*-α-methylstyrene) Thermoplastic Elastomers. *J. Polym. Sci., Polym. Chem. Ed.* 1994, A32:403-12.

Zhou, Y, et al. Synthesis of poly(isobutylene-b-tert-butyl vinyl ether) and poly(isobutylene-b-tert-butyldimethylsilyl vinyl ether) dublock copolymers. Polymer Preprints, 2003, 44(2): 661-2.

\* cited by examiner

END-CAPPED POLYMER CHAINS AND PRODUCTS THEREOF

RELATED APPLICATIONS

This application is a divisional of U.S. application Ser. No. 10/776,681, filed on Feb. 11, 2004, now U.S. Pat. No. 7,056,985, issued on Jun. 6, 2006. The entire contents of this application are hereby incorporated by this reference.

FIELD OF THE INVENTION

This invention relates to processes for end-capping a cationically polymerized polymer. More particularly this invention relates to processes for end-capping a cationically polymerized polymer with an anionic group, after which the resulting anionically terminated polymer can be used in subsequent anionic reactions, including anionic coupling and polymerization reactions.

BACKGROUND OF THE INVENTION

It is well known that living polymerization (i.e., polymerization proceeding in the practical absence of chain transfer and termination) is a very useful method for designing polymer structures, permitting for example, control of the molecular weight and molecular weight distribution of the polymer, as well as enabling functional groups to be positioned at desired points in the polymer chain. Since Szwarc et al. demonstrated the living nature of polystyryllithium formed from the reaction of sodium naphthalene and styrene in the 1950s, a wide variety of living polymerization schemes have been developed, including cationic, anionic, radical, ring-opening, and group transfer polymerization.

Copolymers are an important class of polymers and have numerous commercial applications. For instance, their unique properties, whether in pure form, in blends, in melts, in solutions, and so forth, lead to their use in a wide range of products, for example, compatiblilizers, adhesives and dispersants. An advantage of combining various polymerization techniques (e.g., cationic and anionic polymerization techniques in the case of the present invention) is that new copolymers, each with its own unique properties, can be prepared which could not otherwise be prepared using a single polymerization method.

For example, polyisoolefins are attractive materials because the polymer chain is fully saturated and, consequently, the thermal and oxidative stability of this polymer are excellent. Polyisoolefins are prepared by cationic polymerization. Recently, Muller et al. reported that poly(alkyl methacrylate)-b-polyisobutylene and poly(alkyl methacrylate)-b-polyisobutylene-b-poly(alkyl methacrylate) copolymers can be prepared by the combination of cationic and anionic polymerization techniques. See Feldthusen, J.; Iván, B.; Müller, A. H. E. *Macromolecules,* 1997, 30, 6989-6993; Feldthusen, J.; Iván, B.; Müller, A. H. E. *Macromolecules* 1998, 31, 578-585. In this process, an end-functionalized polyisobutylene (PIB), specifically 1,1-diphenyl-1-methoxy end-functionalized polyisobutylene,

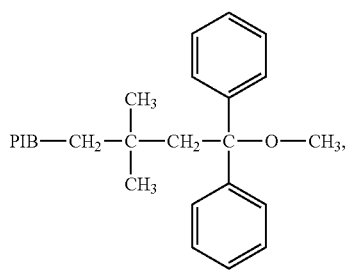

or 2,2-diphenylvinyl end-functionalized polyisobutylene,

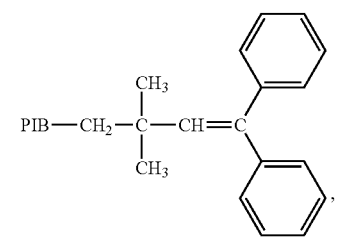

is prepared by the reaction of living polyisobutylene with 1,1-diphenylethylene. The chain end of the resulting polymer is subsequently metallated with alkali metal compounds such as sodium/potassium alloy or cesium in tetrahydrofuran at room temperature. The thus produced macroanion is capable of polymerizing monomer. This method, however, is inconvenient because of the complicated process for the metallation of the polymer chain using alkali metal compounds.

A more recent attempt to combine cationic and anionic polymerization techniques involves the preparation of end-functionalized polymers (e.g., end-functionalized polyisobutylene) by reacting a carbocationically terminated polymer with a heterocyclic compound (e.g., thiophene) to provide an end-capped polymer (e.g., thiophene end-functionalized polyisobutylene). The end-capped polymer is then reacted with an organolithium compound to yield an anionically terminated polymer, which is subsequently reacted with an anionically polymerizable monomer such as tert-butyl methacrylate to produce a copolymer. See, Application Ser. No. 60/480,121 filed Jun. 20, 2003 and entitled "End-Capped Polymer Chains and Products Thereof", and Martinez-Castro, N.; Lanzendolfer, M. G.; Muller, A. H. E.; Cho, J. C.; Acar, M. H.; and Faust, R. *Macromolecules* 2003, 36, 6985-6994. An advantage of this process is that simple and complete metallation is achieved. This process, however, is also subject to improvement. For example, in the case where thiophene end-functionalized polyisobutylene is formed, to prevent coupling between thiophene functionalized polyisobutylene and living polyisobutylene, an excess of thiophene is used while functionalizing the polyisobutylene cation with the thiophene. Moreover, the blocking efficiency was found to be only about 80% even when a low molecular weight product is targeted.

SUMMARY OF THE INVENTION

According to one aspect of the present invention, a method is provided in which a double diphenylethylene compound is reacted with a polymer that contains a carbocationically terminated chain, which chain contains a plurality of constitutional units corresponding to cationically polymerizable monomer species, thereby providing a 1,1-diphenylene end-functionalized chain. Subsequently, an alkylating agent is reacted with the 1,1-diphenylene end-functionalized chain, resulting in the formation of an alkylated 1,1-diphenylene end-functionalized chain.

In certain embodiments, the above method further comprises (a) optionally combining a 1,1-diphenylorganolithium compound with the alkylated 1,1-diphenylene end-functionalized polymer to remove impurites, followed by (b) reacting an organolithium compound with the alkylated 1,1-diphenylene end-functionalized polymer, resulting in the formation of an anionically terminated polymer, which can be used, for example, in subsequent anionic polymerization and coupling reactions.

According to another aspect of the present invention, a novel polymer is provided that comprises a polymer chain, which chain further comprises the following: (a) a plurality of constitutional units that correspond to cationically polymerizable monomer species and (b) an end-cap comprising a diphenylethylene group. Examples of diphenylethylene groups include

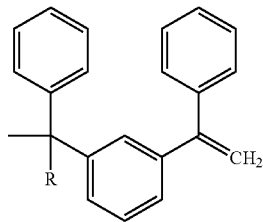

groups and

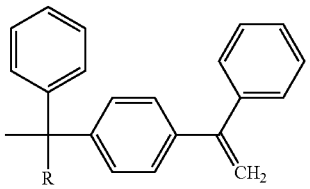

groups, where R is a branched or unbranched alkyl group, typically containing from 1 to 20 carbons, more typically containing from 1 to 10 carbons. In other aspects, the end-cap comprises a

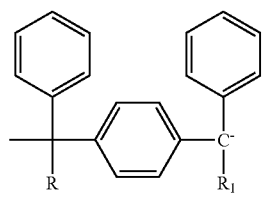

group or a

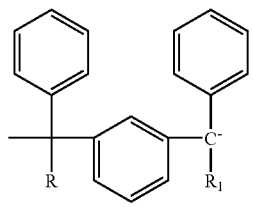

group, where R is a branched or unbranched alkyl group containing from 1 to 20 carbons and $R_1$ is a branched, unbranched, or cyclic alkyl group or an aryl group, containing from 1 to 20 carbons According to yet another aspect of the present invention, a novel copolymer is provided, which includes: (a) a first polymer block that comprises a plurality of constitutional units corresponding to cationically polymerizable monomer species, (b) a second polymer block that comprises a plurality of constitutional units corresponding to anionically polymerizable monomer species, and (c) a linking moiety which links the first and second polymer blocks together selected from a

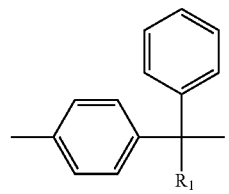

group and a

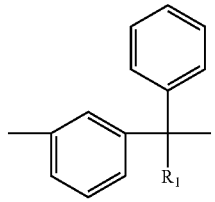

group (for example, a linking moiety selected from a

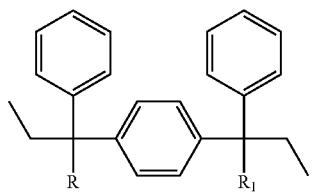

group and a

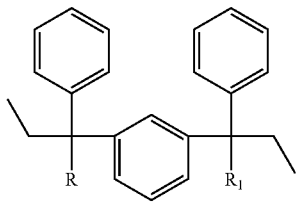

group), where R is a branched or unbranched alkyl group, typically containing from 1 to 20 carbons, more typically containing from 1 to 10 carbons, and where $R_1$ is a branched, unbranched, or cyclic alkyl group or an aryl group, also typically containing from 1 to 20 carbons, more typically containing from 1 to 10 carbons.

Other aspects of the present invention relate to novel copolymers that comprise: (a) a first polymer block that comprises a plurality of constitutional units that correspond to isobutylene; and (b) a second polymer block that comprises a plurality of constitutional units that correspond to hydroxyethyl methacrylate. Examples include copolymers in which (a) the first block is a polyisobutylene block and (b) the second polymer block is a poly(hydroxyethyl methacrylate) block or is a random polymer block that contains constitutional units corresponding to hydroxyethyl methacrylate and to methyl methacrylate.

An advantage of the present invention is that copolymers can be prepared via the combination of living cationic polymerization and living anionic polymerization. Hence, copolymers containing one or more cationically polymerized blocks and one or more anionically polymerized blocks can be formed.

Another advantage of the present invention is that end-capped polymers formed of cationically polymerizable monomers can be quantitatively reacted with organolithium compounds to form stable anionic macroinitiators, which are then available for numerous anionic polymerization and coupling reactions.

These and other aspects, embodiments and advantages of the present invention will be more fully understood upon review of the Detailed Description to follow.

DETAILED DESCRIPTION

As is well known, polymers are molecules that contain one or more chains, each containing multiple copies of one or more constitutional units. An example of a common polymer is polystyrene

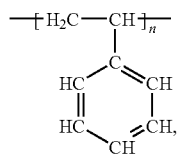

where n is an integer, typically an integer of 10 or more, more typically on the order of 10's, 100's, 1000's or even more, in which the constitutional units in the chain correspond to styrene monomers:

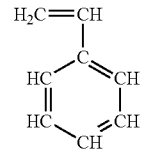

(i.e., they originate from, or have the appearance of originating from, the polymerization of styrene monomers—in this case the addition polymerization of styrene monomers). Copolymers are polymers that contain at least two dissimilar constitutional units. As used herein a polymer "block" is defined as a grouping of 10 or more constitutional units, commonly 20 or more, 50 or more, 100 or more, 200 or more, 500 or more, or even 1000 or more units, and can be branched or unbranched. A "chain" is a linear (unbranched) grouping of 10 or more constitutional units (i.e., a linear block). In the present invention, the constitutional units within the blocks and chains are not necessarily identical, but are related to one another by the fact that that they are formed in a common polymerization technique, e.g., a cationic polymerization technique or anionic polymerization technique.

In accordance with one aspect of the present invention, copolymers are provided which include (a) one or more blocks which contain a plurality of constitutional units that correspond to one or more cationically polymerizable monomer species and (b) one or more blocks which contain a plurality of constitutional units that correspond to one or more anionically polymerizable monomer species. These constitutional units occur within the copolymer molecule at a frequency of at least 10 times, and more typically at least 50, 100, 500, 1000 or more times.

The copolymers of the present invention embrace a variety of configurations, including linear and branched configurations. Branched configurations include star-shaped configurations (e.g., configurations in which three or more chains emanate from a single region), comb configurations (e.g., graft copolymers having a main chain and a plurality of side chains), and dendritic configurations (e.g., arborescent or hyperbranched copolymers).

Some examples of cationically polymerizable monomer species follow: (a) olefins, including isomonoolefins with 4 to 18 carbon atoms per molecule and multiolefins with 4 to 14 carbon atoms per molecule, for example, isobutylene, 2-methylbutene, isoprene, 3-methyl-1-butene, 4-methyl-1-pentene, beta-pinene, and the like, (b) vinyl aromatics such as styrene, alpha-methyl styrene, para-chlorostyrene, para-methylstyrene, and the like, and (c) vinyl ethers such as methyl vinyl ether, isobutyl vinyl ether, butyl vinyl ether, N-vinyl carbazole, and the like.

Examples of anionically polymerizable monomer species include the following: acrylates, methacrylates, styrene, styrene derivatives, and conjugated dienes including 1,3-butadiene and isoprene. Of particular benefit are acrylate or methacrylate monomers having the formula $CH_2$=$CHCO_2R$ or $CH_2$=$C(CH_3)CO_2R$ where R is a substituted or unsubstituted, branched, unbranched or cyclic alkyl groups containing 1 to 20 carbons. Substituents for the alky groups include hydroxyl, amino and thiol functional groups, among others. In embodiments where monomers are utilized that have functional groups, proper protection of the functional group is commonly needed during the course of anionic polymerization. Specifc examples of nonfunctional and protected functional methacrylate monomers include ethyl methacrylate, methyl methacrylate, tert-butyl methacrylate, isodecyl methacrylate, dodecyl methacrylate, stearyl methacrylate, glycidyl methacrylate, 2-[(trimethylsilyl)oxy]ethyl methacrylate, 2-[(tert-butyldimethylsilyl)oxy]ethyl methacrylate, and 2-[(methoxymethyl)oxy]ethyl methacrylate.

The copolymers of the present invention tyically have a molecular weight ranging from 200 to 2,000,000, more typically from 500 to 500,000. The ratio of constitutional units corresponding to the cationically polymerized monomers (e.g., isobutylene) relative to the constitutional units corresponding to the anionically polymerized monomers (e.g., methyl methacrylate) in the copolymer usually ranges from 1/99 to 99/1 w/w, preferably from 30/70 to 95/5 w/w. In some embodiments, copolymers are provided which have a narrow molecular weight distribution such that the ratio of weight average molecular weight to number average molecular weight (Mw/Mn) (i.e., the polydispersity index) of the polymers ranges from about 1 to 10, or even from about 1 to 2.

As a specific example, block copolymers of the formula $X(PCA-C-PAN)_n$ are formed in various embodiments of the invention, where X corresponds to the initiator species, C corresponds to the capping species, PCA is a polymer block comprising a plurality of constitutional units that correspond to one or more anionically polymerizable monomer species, for example, a polyolefin block, PAN is a is polymer block comprising a plurality of constitutional units that correspond to one or more anionically polymerizable monomer species, for example, a poly(methyl methacrylate) block, and n is a positive whole number. Linear block copolymers are formed where n=1 or n=2. Where n=2, the copolymers are sometimes referred to as triblock copolymers. This terminology disregards the presence of the initiator fragment, for example, treating PCA-X-PCA as a single olefin block, with the triblock therefore denoted as PCA-PAN-PCA. Star shaped copolymers are formed where n=3 or more. The value of n is typically dictated by the functionality of the initiator molecule, with monofunctional initiators corresponding to n=1, difunctional initiators corresponding to n=2, and so forth.

In accordance with another aspect of the present invention, copolymers are made by a process that includes: (a) providing a 1,1-diphenylene end-functionalized polymer (which polymer contians one or more cationically polymerizable monomer species); and (b) reacting the 1,1-diphenylene end-functionalized polymer with an organometallic compound to yield an anionically terminated polymer (also referred to herein as a "macrocarbanion", or a "anionic macroinitiator" based on its ability to initiate further reactions such as coupling and polymerization reactions.

For instance, in accordance with an embodiment of the present invention, a living macrocarbocation, e.g., living cationic polyisobutylene, is reacted with a double diphenylethylene, e.g., 1,3-bis(1-phenylethenyl)benzene (sometimes referred to as meta-double diphenylethylene) or 1,4-bis(1-phenylethenyl)benzene (sometimes referred to as para-double diphenylethylene), to produce a 1,1-diphenylethylene end-functionalized carbocationic polymer. The carbocation is then alkylated with a suitable alkylating agent, e.g., with an organometallic compound such as dimethylzinc, whereupon the resulting macromonomer is readily metallated with a suitable organometallic compound such as an alkyllithium compound, thereby providing a living anionic macroinitiator in near quantitative yield. A sterically hindered lithium compound, e.g., a 1,1-diphenylalkyllithium species, is used in certain embodiments to remove impurities that may be present alongside the 1,1-diphenylethylene end-functionalized polymer, thereby preventing premature termination of the living macroanion.

In some embodiments, anionic macroinitiators formed in accordance with the present invention are used to synthesize star polymers (e.g., polyisobutylene stars), for example, by reacting the macroinitiators with coupling molecules such as unhindered chlorosilanes. Chlorosilanes have been used previously to couple living anionic chain ends to form star polymers in Roovers, J. E. L. and S. Bywater, *Macromolecules* 1972, 5, 385 and in Application Ser. No. 60/480,121 filed Jun. 20, 2003.

In some embodiments, anionic macroinitiators formed in accordance with the present invention are used to efficiently initiate living polymerization of ionically polymerizable monomer species, e.g., acrylate or methacrylate monomers, yielding block copolymers with high blocking efficiency. The "blocking or crossover efficiency" is the percentage of macroanions that actually initiate polymerization (of acrylate or methacrylate monomers in this instance). The resulting block copolymers, e.g., diblock polymers, triblock copolymers, radial-shaped block copolymers, etc., will exhibit properties that depend upon the cationically and anionically polymerizable species found within the block copolymer, as well as their absolute and relative amounts.

In other embodiments of the invention, block copolymers are reacted (subsequent to anionic polymerization and before anion quenching) with coupling molecules such as (di- or trichloromethyl)benzene or (di- or tribromomethyl)benzene, thereby forming larger-scale copolymers (e.g., PIB-PMMA stars) Application Ser. No. 60/480,121 filed Jun. 20, 2003.

Further details are provided below.

Preparation of 1,1-Diphenylethylene End-Functionalized Polymers.

In accordance with an embodiment of the present invention, 1,1-diphenylethylene end-functionalized polymers are prepared from a living carbocationic polymer. Carbocationically terminated polymers are commonly formed at low temperature from a reaction mixture that comprises: (a) an initiator, (b) a Lewis acid coinitiator, (c) a cationically polymerizable monomer, (c) an optional proton scavenger and (d) an optional diluent.

Suitable initiators include organic ethers, organic esters, and organic halides. Initiators may be monofunctional, difunctional, trifunctional and so forth, thereby producing, for example, diblock copolymers, triblock copolymers, and radial-shaped block copolymers, respectively. Specific examples include tert-alkyl chloride, cumyl ethers, cumyl halides, cumyl esters, and hindered versions of the same, for instance, 2-chloro-2,4,4-trimethylpentane, 5-tert-butyl-1,3-bis(1-chloro-1-methylethyl)benzene, 5-tert-butyl-1,3-bis(1-methoxy-1-methylethyl)benzene, 5-tert-butyl-1,3-bis(1-acetoxy-1-methylethyl)benzene, 1,3,5-tris(1-chloro-1-methylethyl)benzene, 1,3,5-tris(1-methoxy-1-methylethyl)benzene, and 1,3,5-tris(1-acetoxy-1-methylethyl)benzene.

Examples of suitable Lewis acid coinitiators include metal halides and alkyl metal halides such as boron trichloride, titanium tetrachloride and alkyl aluminum halides (e.g., chlorodiethyl aluminum, dichloroethyl aluminum, chlorodimethyl aluminum, dichloromethyl aluminum). A commonly used coinitiator is titanium tetrachloride. The coinitiator is usually used in concentrations equal to or greater than that of initiator, e.g., 1 to 100 times higher, preferably 2 to 40 times higher than that of initiator.

A proton scavenger, typically a Lewis base, typically provided to ensure the virtual absence of protic impurities, such as water, which can lead to polymeric contaminants in the final product. Examples of proton scavengers (also referred to as proton traps) include sterically hindered pyridines, for example, substituted or unsubstituted 2,6-di-tert-butylpyridines, such as 2,6-di-tert-butylpyridine and 4-methyl-2,6-di-tert-butylpyridine, as well as 1,8-bis(dimethylamino)-naphthalene and diisopropylethyl amine. The proton trap is usually used at the concentration of 1 to 10 times higher than that of protic impurities in the polymerization system.

The various reactions of the present invention are tyically carried out in the presence of a diluent or a mixture of diluents. For the the cationic polymerization and end-capping reactions, typical diluents include (a) halogenated hydrocarbons which contain from 1 to 4 carbon atoms per molecule, such as methyl chloride and methylene dichloride, (b) aliphatic hydrocarbons and cycloaliphatic hydrocarbons which contain from 5 to 8 carbon atoms per molecule, such pentane, hexane, heptane, cyclohexane and methyl cyclohexane, or (c) mixtures thereof. For example, in some embodiments, the solvent system contains a mixture of a polar solvent, such as methyl chloride, methylene chloride and the like, and a nonpolar solvent, such as hexane, cyclohexane or methylcyclohexane and the like.

Regardless of the synthesis technique, once a desired living carbocationically terminated polymer is obtained, it is then available for 1,1-diphenylethylene end-funcitonalization using a double diphenylethylene species, for example, 1,3-bis(1-phenylethenyl)benzene,

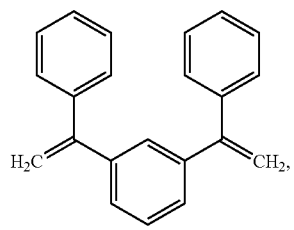

or 1,4-bis(1-phenylethenyl)benzene,

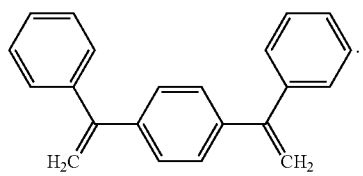

The 1,4-bis(1-phenylethenyl)benzene is tyically more beneficial than the 1,3-bis(1-phenylethenyl)benzene for the functionalization of both living anionic and cationic polymers, because a coupled product is tyically not generated where the 1,4-bis(1-phenylethenyl)benzene is employed. In the present invention, double diphenylethylene is tyically employed at a concentration that is 1 to 10 times higher than that of the initiator, more typically 1 to 6 times higher than that of the initiator. In this regard, it is known that 1,1-diphenylethylene end-functionalized polyisobutylene can be prepared by the reaction of a living cationic polymer such as polyisobutylene with 1,3-bis(1-phenylethenyl)benzene or 1,4-bis(1-phenylethenyl)benzene. See Bae, Y. C.; Faust, R. *Macromolecules* 1998, 31(26), 9379-9383. Unfortunately, the quenching reaction of a living diphenyl carbenium ion (e.g., a polymer end-functionalized with 1,1-diphenylethylene carbocation) with methanol introduces a labile methoxy group at the chain end, which will lead to side reactions. Side reactions include the termination of subsequently added organolithium compounds as well as the macroinitiators that are formed from the subsequently added organolithium compounds.

To prevent this, in various embodiments of the present invention, the 1,1-diphenylethylene carbocation is subjected to an alkylation reaction. In general, the alkylation is carried out with an organometallic compound, such as an alkyl aluminum compound and an alkyl zinc compound which typically contains from 1 to 20 carbon atoms, for example, selected from various branched or unbranched alkyl groups. In the present invention, the alkyl aluminum or alkyl zinc compound is typically used at a concentration ranging from 0.1 to 100 times the coinitiator concentration, more typically 0.1 to 10 times the coinitiator concentration.

Bae, Y. C.; Kim, I-J.; Faust, R. *Polymer Bulletin* 2000, 44(5-6), 453-459, has reported the methylation of

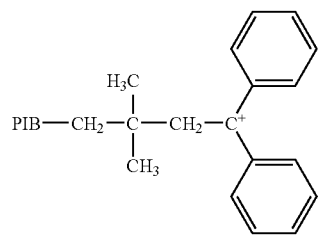

with dimethylzinc to form

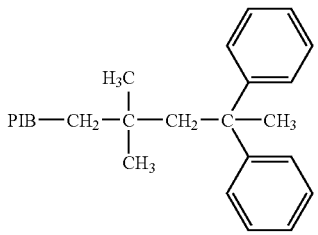

Temperatures for the polymerization of the cationically polymerizable monomer, as well as the subsequent end-functionalization and alkylation of the resulting living polymer, will typically range from 0° C. to −150° C., more typically from −10° C. to −90° C. Reaction time for the cationic polymerization and the functionalization and alkylation of of the resulting living cationic polymer will typically range from a few minutes to 24 hours, more typically from 10 minutes to 10 hours.

The number average molecular weight of the resulting 1,1-diphenylethylene end-functionalized polymer will typically range from 1,000 to 1,000,000, more typically from 5,000 to 500,000.

A specific example of a procedure for the preparation of 1,1-diphenylethylene end-functionalized polymers follows. First, a living caibocationically terminated polymer, e.g., carbocationically terminated polyisobutylene, is obtained by adding a coinitiator into a polymerization zone (e.g., a flask), which contains initiator, proton trap, monomer and diluent as discussed above. After polymerizatoin of the monomer is complete, the resulting living cationic polymer, in this instance, living carbocationically terminated polyisobutylene (PIB),

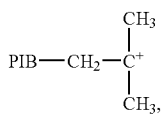

is reacted with a double diphenylethylene species, in this example 1,4-bis(1-phenylethenyl)benzene,

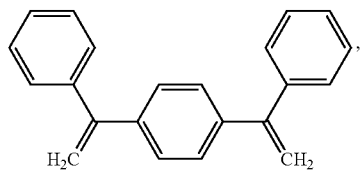

for example, by dissolving the double diphenylethylene species in a diluent and charging it to the polymerization zone, whereupon a carbenium cation, e.g.,

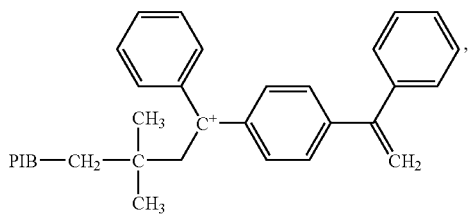

is formed. An alkyl zinc or alkyl aluminum compound, e.g., dimethylzinc $(CH_3)_2Zn$, is then supplied to alkylate the carbenium ion, for example, by dissolving it in a diluent and charging the resulting solution to the polymerization zone. Prechilled alcohol is then charged to the polymerization zone to quench the reaction. The resulting 1,1-diphenylethylene end-functionalized polymer product, e.g.,

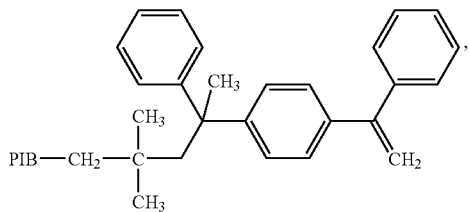

is then recovered.

Preparation of Block Copolymer Using 1,1-Diphenylethylene End-Functionalized Macromer.

Once a 1,1-diphenylethylene end-functionalized macromer is provided, it is readily metallated with an organometallic compound, and the resulting anionic macroinitiator is then available for a variety of reactions, including the living anionic polymerization reactions and anionic coupling reactions.

Organometallic compounds suitable for the metallation of the 1,1-diphenylethylene end-functionalized macromer can be selected, for example, from a wide range of organolithium compounds of the formula RLi in which R is a hydrocarbon group, typically containing from 1 to 20 carbon atoms per molecule, for example, selected from unbranched alkyl groups, branched alkyl groups, cyclic alkyl groups, mono-ring aryl groups and multi-ring aryl groups. Specific examples of suitable organolithium compounds include methyllithium, ethyllithium, isopropyllithium, n-butyllithium, sec-butyllithium, tert-butyllithium, tert-octyllithium, phenyllithium, 1-naphthyllithium, p-tolyllithium, cyclohexyllithium, and 4-cyclohexylbutyllithium. Organolithium compounds are typically used at concentrations that are 1 to 50 times the 1,1-diphenylethylene end-functionalized macromer concentration, more typically 1 to 10 times the macromonomer concentration.

The metallation, as well as subsequent living anionic polymerization and coupling processes, are typically carried out in the presence of a diluent or mixture of diluents. Suitable diluents include hydrocarbon solvents, for example, paraffinic, cycloparaffinic, and aromatic hydrocarbon solvents, and polar solvents, for example, ethers such as tetrahydrofuran, dimethylether, diethylether, dioxane, and 1,2-dimethoxyethane.

Reaction times between the organolithium compound and the 1,1-diphenylethylene end-functional polymer will typically range from a few minutes to 24 hours, more typically from 1 hour to 12 hours. Temperatures for the reaction between the organolithium compound and the 1,1-diphenylethylene end-functional polymer will typically range from 30° C. to −100° C., more typically from 30° C. to −90° C.

In some embodiments, a small amount of a sterically hindered lithium compound is charged to the polymerization zone prior to introducing the alkyllithium compound to remove impurities that are frequently present, thereby preventing termination during the reaction of the alkyllithium compound with the 1,1-diphenyethylene end-functionalized polymer. Because the 1,1-diphenylalkyllithium cannot react with 1,1-diphenylethylene end-functionalized polymer due to steric effects, its addition is effective for purposes of removing impurities that are present in the solution.

Examples of sterically hindered organolithium compounds include organolithium compounds of the formula $RC(Ø_1)(Ø_2)Li$ in which R is a hydrocarbon group, typically containing 1 to 20 carbon atoms per molecule, including unbranched alkyl groups, branched alkyl groups, cyclic alkyl groups, mono-ring aryl groups, and multi-ring aryl groups, and $Ø_1$ and $Ø_2$ can be the same or different and are selected from unsubstituted or substituted, mono- or multi-ring, aryl groups. Commonly, the sterically hindered organolithium compound is a 1,1-diphenylalkyllithium compound.

1,1-Diphenylalkyllithium may be generated, for example, from the reaction of an alkyllithium compound and 1,1-diphenylethylene at room temperature in the presence of diluent. 1,1-Diphenylethylene is typically used in concentrations equal to or less than that of the alkyllithium in this reaction. A example of one beneficial 1,1-diphenylalkyllithium compound is 1 1,1-diphenylhexyllithium,

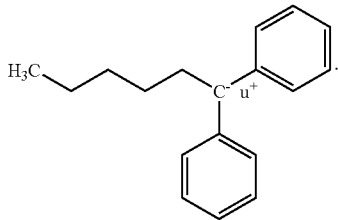

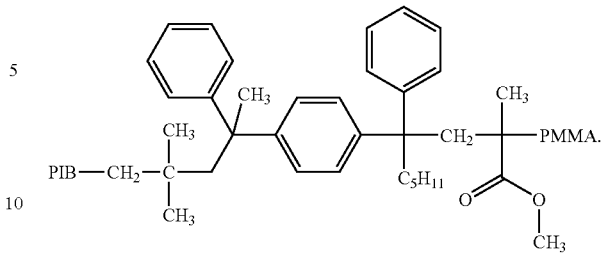

The sterically hindered organolithium compound is typically added to a solution containing the 1,1-diphenylethylene end-functional polymer and a diluent or mixture of diluents, for example, at room temperature. Afterwards, the organolithium compound is added to the 1,1-diphenylethylene functional polymer, for instance, under anionic reaction conditions (e.g., at −78° C.). After a stable living macroinitiator is formed in this fashion, any unreacted alkyllithium may be destroyed by heating, for example, to 40° C. in the presence of a reactive species such as tetrahydrofuran (which can also be used as a diluent).

The resulting anionic macroinitiator is then available for subsequent polymerization or coupling reactions, as desired. For example, in some embodiments, an anionically reactive species such as an anionically polymerizable monomer are added under polymerization conditions (e.g., at −78° C.) to the macroinitiator. After the desired reaction is completed, purified alcohol is typically charged to the polymerization zone to quench the reaction.

Times for anionic polymerization will typically range from a few minutes to 24 hours, more typically from 5 minutes to 12 hours. Temperatures for anionic polymerization will typically range from 0° C. to −100° C., more typically from −10° C. to −90° C.

As a specific example, the reaction of a 1,1-diphenylethylene end-functionalized macromer, for example, 1,1-diphenylethylene end-functionalized polyisobutylene (see above), with an organolithium compound, for example, n-butyl lithium, results in the formation of a carbanion, e.g.,

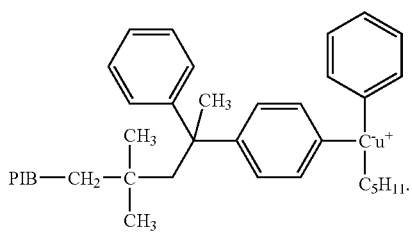

Subsequent exposure of the carbanion to an anionically polymerizable monomer, e.g., a methacrylate monomer such as methyl methacrylate (MMA), results in a copolymer having (a) a cationically polymerized block, for example, a polyisobutylene block, and (b) an anionically polymerized block, for example, a poly(methyl methacrylate) (PMMA) block:

EXAMPLES

Characterizations. $^1$H-NMR spectroscopy was carried out on a Bruker AC 250 MHz spectrometer at 25° C. in CDCl$_3$. Gel Permeation Chromatorgraphy (GPC) was carried out using a Waters HPLC system equipped with model 510 HPLC pump, model 410 differential refractometer, model 486 UV/visible detector, model 712 sample processor, and five ultra-Styragel columns connected in the series (500, 10$^3$, 10$^4$, 10$^5$ and 100 Å). THF was used as an eluent at a flow rate of 1 mL/min.

Materials. 2,6-Di-tert-butylpyridine (Aldrich, 97%) was purified by distillation from CaH$_2$. Isobutylene (Air Gas) was passed through in-line gas purifier columns packed with CaSO$_4$ and no. 13 molecular sieves and condensed at −15° C. prior to polymerization. Methyl chloride (CH$_3$Cl) was passed through in-line gas purifier columns packed with BaO/Drierite and condensed at −80° C. prior to polymerization. Methylene chloride (CH$_2$Cl$_2$) was purified by washing it with 10% aqueous NaOH and then with distilled water until neutral and dried over anhydrous MgSO$_4$ overnight. It was refluxed for 24 h and distilled from CaH$_2$, just before use. n-Hexane was rendered olefin free by refluxing it over concentrated sulfuric acid for 48 h. It was washed with 10% aqueous NaOH and then with deionized water until neutral and stored over MgSO$_4$ for 24 h. It was refluxed over CaH$_2$ overnight and distilled. Titanium (IV) chloride (TiCl$_4$, Aldrich, 99.9%) was used as received. 2-Chloro-2,4,4-trimethylpentane was prepared by hydrochlorination of 2,4,4-trimethyl-1-pentene (Fluka, 98%) with hydrogen chloride gas in dry dichloromethane at 0° C. Kaszas, G.; Gyor, M.; Kennedy, J. P.; Tüdös, F. *J. Macromol. Sci., Chem* 1983, A18, 1367-1382. The product was dried over CaCl$_2$ and distilled under reduced pressure before use. 5-tert-butyl-1,3-bis(1-chloro-1-methylethyl)benzene was synthesized following the procedure reported in Gyor, M. Wang., H. C.; Faust, R. J. *J. Macromol. Sci., Pure Appl. Chem* 1992, A29, 639. Tetrahydrofuran (Merck p.a) was purified first by distillation under nitrogen from CaH$_2$ and then by refluxing over potassium. n-Butyllithium (n-BuLi, 2.5 M in hexane) was purchased from Aldrich and its concentration was titrated by a standard method. See, e.g., Reed, P. J.; Urwin, J. R. *J. Organometal. Chem.* 1972, 39, 1-10. Methyl methacrylate (MMA) and 2-[(trimethylsilyl)oxy]ethyl methacrylate (TMSiOEMA), in which the hydroxyl group of 2-hydroxyethyl methacrylate (HEMA) is protected with a trimethylsilyl group, were dried over CaH$_2$ for 24 h and then distilled over triethylaluminum or trioctylaluminum under vacuum. The 1,4-Bis(1-phenylethenyl)benzene is synthesized using procedures like that described in U.S. Pat. No. 4,182,818 to Tung, L. H. and Lo, G. Y.-S. 1,1-Diphenylethylene purchased from Aldrich Chemical Company was purified by vacuum distillatin under potassium metal.

Synthesis of 1,1-diphenyhexyllithium. The preparation of 1,1-diphenylhexyllithium is carried out under high vacuum conditions (<10$^{-6}$ mbar). 0.037 g of n-butyllithium (5.7×10$^{-4}$ mol) is added at −78° C. to a reactor containing 0.01 mL of 1,1-diphenylethylene (5.7×10$^{-5}$ mol) dissolved in tetrahydrofuran. After 5 minutes, the cherry-reddish solution is brought to room temperature for 1 hour. During this step, unreacted n-butyllithium is decomposed by the reaction with tetrahydrofuran. The solution is delivered into a graduated cylinder with a stopcock, which is stored in a refrigerator.

Synthesis of α,ω-1,1-diphenylethylene end-functionalized polyisobutylene. The preparation of a difunctional macromonomer is carried out at −80° C. under nitrogen atmosphere. To a prechilled 500 mL 3-neck flask equipped with mechanical stirrer are added sequentially 187 mL of hexane, 111 mL of methyl chloride, 0.086 g of 5-tert-butyl-1,3-bis(1-chloro-1-methylethyl)benzene (3.0×10$^{-4}$ mol), 0.2 mL of 2,6-di-tert-butylpyridine (9.0×10$^{-4}$ mol), and 21 mL of isobutylene (0.27 mol). Then, 1.2 mL of titanium tetrachloride (1.1×10$^{-2}$ mol) is added into the reactor to polymerize the isobutylene. After the completion of monomer polymerization, 0.34 g of 1,4-bis(1-phenylethenyl)benzene (1.2×10$^{-3}$ mol) dissolved in methylene chloride is added into the reactor. After 2 hours, 5.15 g of dimethylzinc (5.4×10$^{-2}$ mol) dissolved in toluene is added into the reactor. 2 hours later, 30 mL of prechilled methanol is added into the reactor to quench the reaction. The polymer solution is then poured into ammonium hydroxide/methanol (10/90, v/v). After the evaporation of solvents, the polymer is dissolved in hexane and inorganics are filtered. The polymer recovered by the precipitation of the polymer solution into methanol. The polymer is then dissolved again in hexane and recovered again by the precipitation of the polymer solution into methanol, followed by drying in a vacuum.

According to $^1$H NMR and GPC measurements, functionalization and methylation at polyisobutylene chain ends are essentially complete. Essentially no change in the number average molecular weight and polydispersity of the 1,1-diphenylethylene functional polyisobutylene was observed, relative to those of the polyisobutylene precursor (Table 1), confirming that coupling reactions are virtually nonexistant.

TABLE 1

| Polymer | $M_n$ | $M_w/M_n$ |
| --- | --- | --- |
| Polyisobutylene | 55000 | 1.03 |
| α,ω-1,1-Diphenylethylene end-functional polyisobutylene | 56800 | 1.04 |

Synthesis of ω-1,1-diphenylethylene end-functionalized polyisobutylene. The preparation of monofunctional macromonomer is carried out at −80° C. under nitrogen atmosphere. To a prechilled 500 mL flask equipped with mechanical stirrer are added sequentially 198 mL of hexane, 118 mL of methyl chloride, 0.1 mL of 2-chloro-2,4,4-trimethylpentane (6.0×10$^{-4}$ mol), 0.2 mL of 2,6-di-tert-butylpyridine (9.0×10$^{-4}$ mol), and 4.7 mL of isobutylene (0.06 mol). 1.2 mL of titanium tetrachloride (1.1×10$^{-2}$ mol) is then added into the reactor to polymerize the isobutylene. After the completion of monomer polymerization, 0.34 g of 1,4-bis(1-phenylethenyl)benzene (1.2×10$^{-3}$ mol) dissolved in methylene chloride is added into the reactor. After 2 hours, 5.15 g of dimethylzinc (5.4×10$^{-2}$ mol) is added into the reactor. After 2 more hours, 30 mL of prechilled methanol is added into the reactor to quench the reaction. The polymer solution is then poured into ammonium hydroxide/methanol (10/90, v/v). After the evaporation of solvents, the polymer is dissolved in hexane and inorganics are filtered. The polymer solution is then precipitated into methanol to give solid polymer. The solid polymer is again dissolved in hexane and recovered again by the precipitation of the polymer solution into methanol, followed by drying under vacuum.

According to $^1$H NMR and GPC measurements, functionalization and methylation at the polyisobutylene chain end are essentially complete. Number average molecular weight and polydispersity of 1,1-diphenylethylene functional polyisobutylene did not change substantiallly as compared with those of polyisobutylene (Table 2), confirming a virtual absence of coupling reactions.

TABLE 2

| Polymer | $M_n$ | $M_w/M_n$ |
| --- | --- | --- |
| Polyisobutylene | 4500 | 1.09 |
| ω-1,1-Diphenylethylene end-functional polyisobutylene | 4900 | 1.08 |

Example 1

All chemical purifications and acrylate polymerizations are carried out under high vacuum condition (<10$^{-6}$ mbar). 1.17 g (2.06×10$^{-5}$ mol) of α,ω-1,1-diphenylethylene end-functionalized polyisobutylene ($M_n$=56800, see above) in 250 mL of hexane is stirred over calcium hydride for 24 hours. The polymer solution is then filtered to remove calcium hydride. The hexane solvent is evaporated, and 100 mL of tetrahydrofuran are added to the remaining polymer. This polymer solution is then added to a reactor equipped with a stirrer. 1,1-diphenylhexyllithium in tetrahydrofuran (see above) is added into the reactor dropwise until the color of the polymer solution changes from colorless to yellowish. The amount of 1,1-diphenylhexyllithium used for this purpose is 0.0010 g (4.1×10$^{-6}$ mol). The polymer solution is subsequently cooled down to −78° C. with vigorous stirring. After 10 minutes at this temperature, 0.0090 g of n-butyllithium (1.4×10$^{-4}$ mol) in 27.5 mL of hexane is added into the reactor. 12 hours later, the polymer solution is heated up to 40° C. and kept at this temperature for 1 hour. The polymer solution is again cooled to −78° C. After 10 minutes at this temperature, 0.95 mL of methyl methacrylate (8.9×10$^{-3}$ mol) is distilled into the reactor. The reactoin is quenched after 5 hours by adding purified degassed methanol to the reactor. The polymer solution is precipitated into methanol to give a white solid polymer.

The blocking efficiency of the obtained block copolymer is measured using GPC and $^1$H NMR and is calculated to be at least 87%. The product is immersed into hexane for 24 hours to isolate polyisobutylene homopolymer from the block copolymer. According to $^1$H NMR and GPC measurements, the purified block copolymer has a $M_n$=109400, a $M_w/M_n$=1.14, and the composition of isobutylene and methyl methacrylate in the polymer is 57/43 w/w.

Example 2

1.60 g (2.8×10$^{-5}$ mol) of α,ω-1,1-diphenylethylene end-functionalized polyisobutylene ($M_n$=56800, see above) in 200 mL of hexane is stirred over calcium hydride for 24 hours. The polymer solution is then filtered to remove calcium hydride. Solvent is evaporated, and 100 mL of tetrahydrofuran is added to the remaining polymer. The polymer solution is then added to a reactor equipped with a stirrer, and 1,1-diphenylhexyllithium in tetrahydrofuran (see above) is added into reactor dropwise until the color of the polymer solution changes from colorless to yellowish. The amount of 1,1-diphenylhexyllithium used for this purpose is 0.0010 g ($4.1 \times 10^{-6}$ mol). The polymer solution is subsequently cooled to $-78°$ C. with vigorous stirring. After 10 minutes at this temperature, 0.0122 g of n-butyllithium ($1.9 \times 10^{-4}$ mol) in 40 mL of hexane is added into the reactor. After an additional 12 hours, the polymer solution is heated to $40°$ C. and kept at this temperature for 1 hour. The polymer solution is then cooled down to $-78°$ C. After 10 minutes at this temperature, 0.64 mL of methyl methacrylate ($6.0 \times 10^{-3}$ mol) is distilled into the reactor. 5 hours later, purified methanol is added to reactor to quench the reaction. The polymer solution is poured into methanol to yield a white solid polymer.

The blocking efficiency of the obtained block copolymer is measured using GPC and $^1$H NMR and is calculated to be at least 92%. The block copolymer is purified by using hexane to remove polyisobutylene homopolymer. According to $^1$H NMR and GPC measurements, the purified block copolymer had a $M_n=83400$, a $M_w/M_n=1.30$, and the composition of isobutylene and methyl methacrylate in the polymer is 67/33 w/w.

Example 3

1.96 g ($3.45 \times 10^{-5}$ mol) of α,ω-1,1-diphenylethylene end-functionalized polyisobutylene ($M_n=56800$, see above) in 300 mL of hexane is stirred over calcium hydride for 24 hours. The polymer solution is then filtered to remove calcium hydride. The solvent is evaporated and 130 mL of tetrahydrofuran are added to the remaining polymer. The resulting polymer solution is then added to a reactor equipped with a stirrer. 1,1-diphenylhexyllithium in tetrahydrofuran (see above) is then added into reactor dropwise until the color of the polymer solution changes from colorless to yellowish. The amount of 1,1-diphenylhexyllithium used for this purpose is 0.0030 g ($1.2 \times 10^{-5}$ mol). Afterwards, the polymer solution is cooled down to $-78°$ C. with vigorous stirring. After 10 minutes at this temperature, 0.0160 g of n-butyllithium ($2.5 \times 10^{-4}$ mol) in 40 mL of hexane is added into the reactor. 2 hours later, the polymer solution is heated to $40°$ C. and kept at this temperature for 1 hour. Then, the polymer solution is again cooled to $-78°$ C. After 10 minutes at this temperature, 2 mL of 2-[(trimethylsilyl)oxy]ethyl methacrylate ($9.2 \times 10^{-3}$ mol) diluted with 2 mL of tetrahydrofuran is added into the reactor. 3 hours later, purified methanol is added to reactor to quench the reaction. The polymer solution is precipitated into methanol to yield a white solid polymer.

The blocking efficiency is at least 90%, as measured using GPC and $^1$H NMR. The obtained polymer is purified by using hexane to remove polyisobutylene homopolymer. During the recovery step, the trimethylsilyloxy groups in the block copolymer are completely converted into hydroxyl groups. For $^1$H NMR and GPC measurements, the block copolymer is treated with benzoic anhydride to protect the hydroxyl groups in the poly(2-hydroxylethyl methacrylate) blocks with a benzoyl group. According to $^1$H NMR and GPC measurements, the block copolymer treated with benzoic anhydride had a $M_n=131900$, a $M_w/M_n=1.33$, and the composition of isobutylene and 2-hydroxylethyl methacrylate in the polymer is 50/50 w/w.

Example 4

0.93 g ($1.9 \times 10^{-4}$ mol) of ω-1,1-diphenylethylene end-functionalized polyisobutylene ($M_n=4900$, see above) in 200 mL of hexane is stirred over calcium hydride for 24 hours. Then, the polymer solution is filtered to remove calcium hydride. Solvent is evaporated, and 100 mL of tetrahydrofuran is added to the remaining polymer. The polymer solution is added to a reactor equipped with a stirrer. Unlike the above examples, no 1,1-diphenylhexyllithium in tetrahydrofuran is then added to the reactor at this point. The polymer solution is cooled down to $-78°$ C. with vigorous stirring. After 10 minutes at this temperature, 0.0961 g of n-butyllithium ($1.5 \times 10^{-3}$ mol) is added into the reactor. 1 hour later, the polymer solution is heated to $20°$ C. and kept at this temperature for 1 hour. Then, the polymer solution is again cooled to $-78°$ C. After 10 minutes at this temperature, 1.5 mL of methyl methacrylate ($1.4 \times 10^{-2}$ mol) is charged into the reactor. 2 hours later, purified methanol is added to reactor to quench the reaction. The polymer solution is then poured into methanol to yield a white solid polymer.

The blocking efficiency is calculated to be 67% based on GPC and $^1$H NMR results. The obtained polymer is purified using hexane to remove polyisobutylene homopolymer. According to $^1$H NMR and GPC measurements, the purified block copolymer has a $M_n=22300$, a $M_w/M_n=1.26$, and the composition of isobutylene and methyl methacrylate in the polymer is 25/75 w/w.

Example 5

0.24 g of >1,1-diphenylethylene end-functionalized polyisobutylene ($M_n=4900$, see above) in 200 mL of hexane is stirred over calcium hydride for 24 hours. Then, the polymer solution is filtered to remove calcium hydride. Solvent is evaporated and 100 mL of tetrahydrofuran is then added to the remaining polymer. The polymer solution is added to a reactor equipped with a stirrer. No 1,1-diphenylhexyllithium in tetrahydrofuran is added to the reactor at this point. The polymer solution is then cooled down to $-78°$ C. with vigorous stirring. After 10 minutes, 0.0275 g of n-butyllithium ($4.3 \times 10^{-4}$ mol) is added into the reactor. 1 hour later, the polymer solution is heated up to $20°$ C. and kept at this temperature for 1 hour. The polymer solution is then cooled down to $-78°$ C. After 10 minutes at this temperature, 0.6 mL of methyl methacrylate ($5.6 \times 10^{-3}$ mol) is distilled into the reactor. 2 hours later, purified methanol is added to reactor to quench the reaction. The polymer solution is then poured into methanol to yield a white solid polymer.

The blocking efficiency is calculated to be 72% based on GPC and $^1$H NMR results. The obtained polymer is purified using hexane to remove polyisobutylene homopolymer. According to $^1$H NMR and GPC measurements, the purified block copolymer had a $M_n=31700$, a $M_w/M_n=1.13$, and the composition of isobutylene and methyl methacrylate in the polymer is 18/82 w/w.

Example 6

0.14 g of 1,1-diphenylethylene end-functionalized polyisobutylene ($M_n=4900$, see above) in 200 mL of hexane is stirred over calcium hydride for at least 24 hours. The polymer solution is then filtered to remove calcium hydride. Solvent is evaporated and 100 mL of tetrahydrofuran is added to polymer. The polymer solution is added to a reactor equipped with a stirrer. No 1,1-diphenylhexyllithium in tetrahydrofuran is added to the reactor at this point. The polymer solution is then cooled down to −78° C. with vigorous stirring. After 10 minutes at this temperature, 0.016 g of n-butyllithium ($2.5\times10^{-4}$ mol) is added into the reactor. 1 hour later, the polymer solution is heated up to 20° C. and kept for 1 hour at this temperature. The polymer solution is again cooled down to −78° C. After 10 minutes at this temperature, 0.4 mL of methyl methacrylate ($3.7\times10^{-3}$ mol) is charged into the reactor. 2 hours later, purified methanol is added to reactor to quench the reaction. The polymer solution is then poured into methanol to yield a white solid polymer.

The blocking efficiency is calculated to be 68%, based on GPC and $^1$H NMR results. The obtained polymer is purified by using hexane to remove polyisobutylene homopolymer. According to $^1$H NMR and GPC measurements, the purified block copolymer has a $M_n=36900$, an $M_w/M_n=1.20$, and the composition of isobutylene and methyl methacrylate in the polymer is 15/85 w/w.

Although various embodiments are specifically illustrated and described herein, it will be appreciated that modifications and variations of the present invention are covered by the above teachings and are within the purview of the appended claims without departing from the spirit and intended scope of the invention.

What is claimed is:

1. A polymer comprising a polymer chain that comprises (a) a plurality of constitutional units that correspond to cationically polymerizable monomer species and (b) an end-cap comprising a

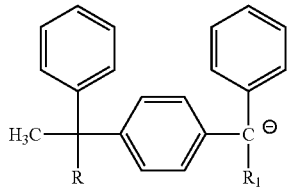

group or a

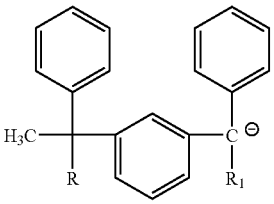

group, where R is a branched or unbranched alkyl group containing from 1 to 20 carbons and $R_1$ is a branched, unbranched, or cyclic alkyl group or an aryl group, containing from 1 to 20 carbons.

2. The polymer of claim 1, wherein $R_1$ is n-pentyl or 2-methyl-butyl.

3. The polymer of claim 2, wherein R is methyl or ethyl.

4. The polymer of claim 1, wherein the number average molecular weight of said polymer ranges from 5,000 to 500,000.

5. The polymer of claim 1, wherein said chain comprises a plurality of constitutional units that correspond to two or more differing cationically polymerizable monomer species.

6. The polymer of claim 1, wherein said polymer comprises two or more of said -polymer chains.

7. The polymer of claim 1, wherein said constitutional units correspond to isobutylene.

* * * * *